J. DI SALVO.
BUMPER BAR AND SUPPORT THEREFOR.
APPLICATION FILED SEPT. 27, 1920.
1,389,344.
Patented Aug. 30, 1921.
5 SHEETS—SHEET 1.
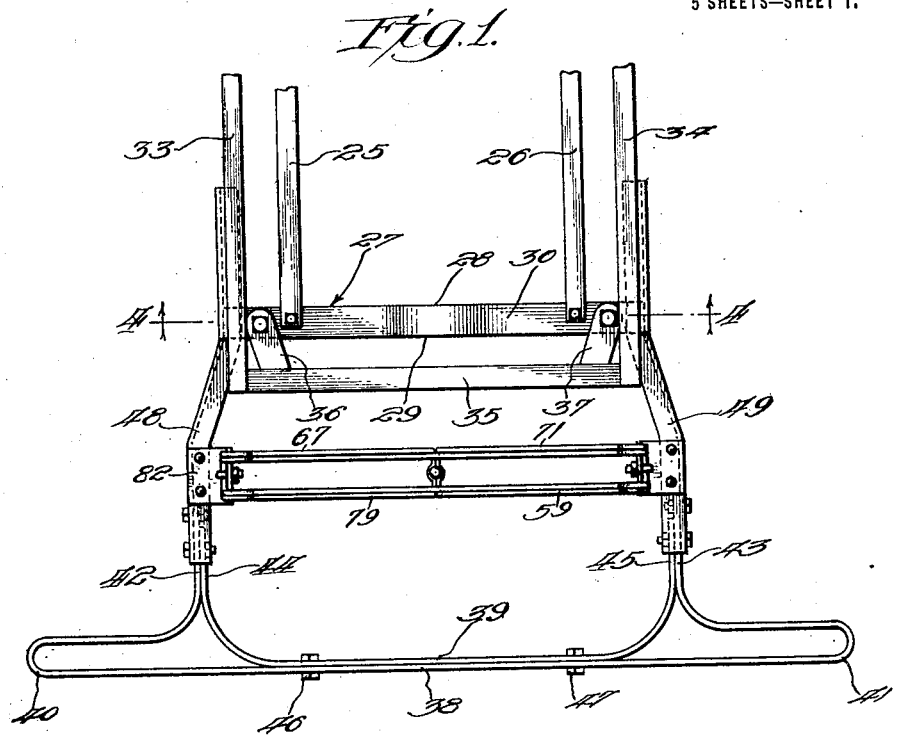
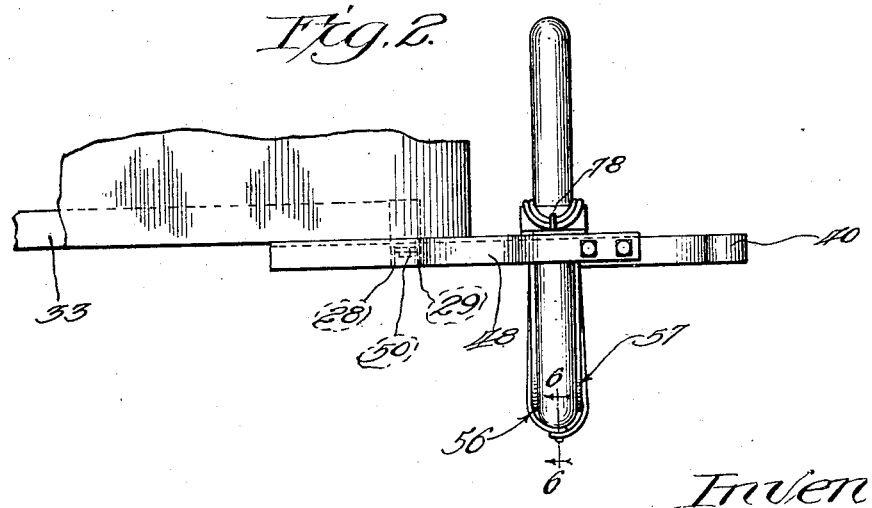
Inventor:
Joseph Di Salvo,
by ... Attys.

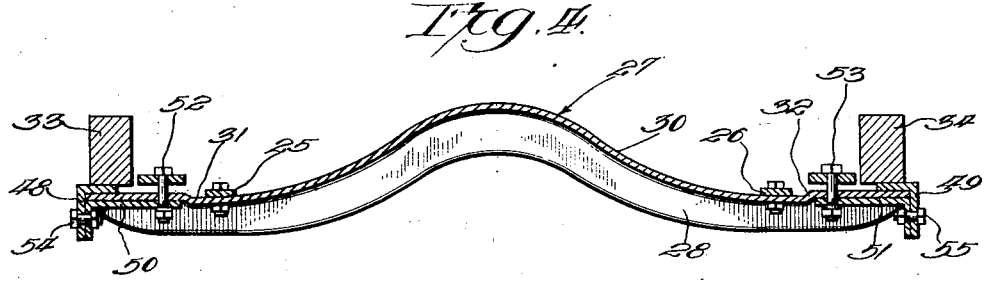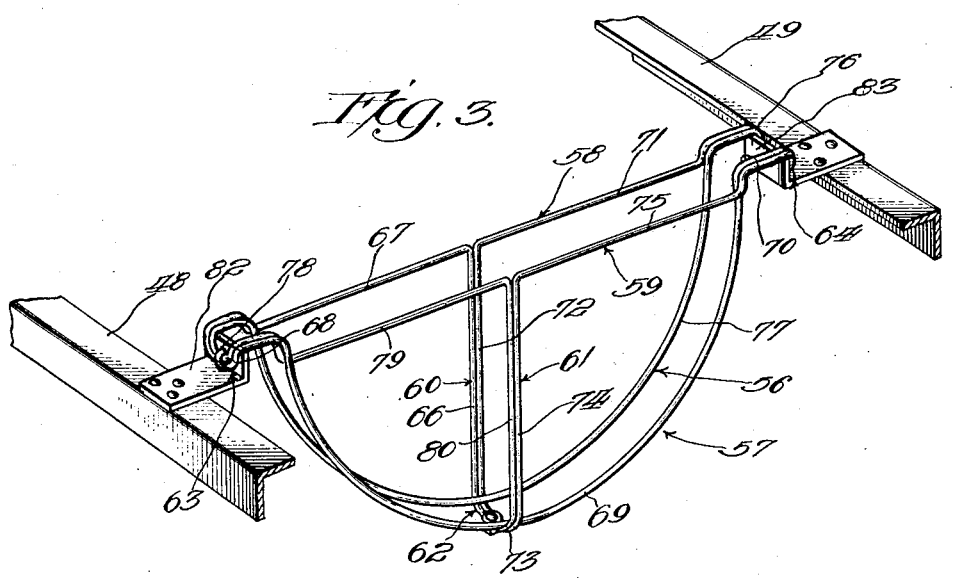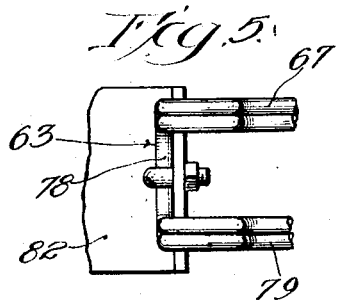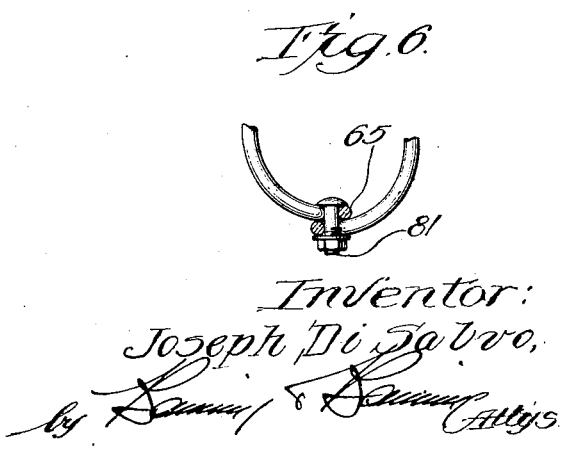

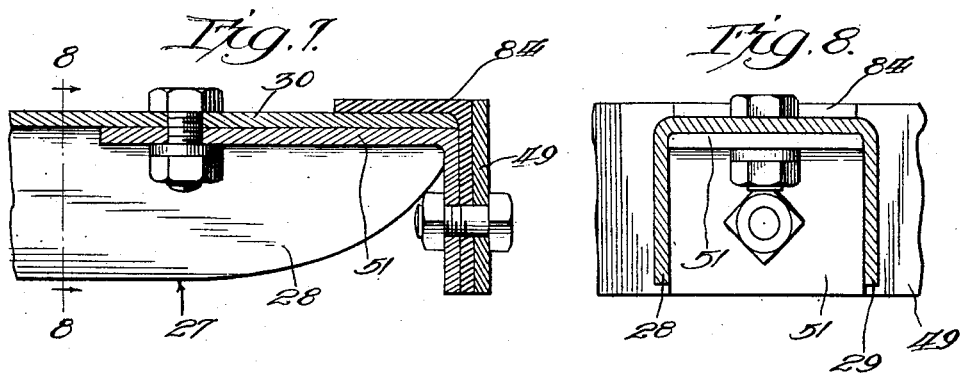
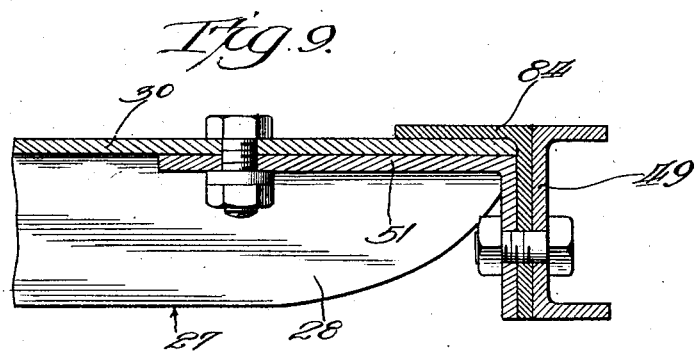
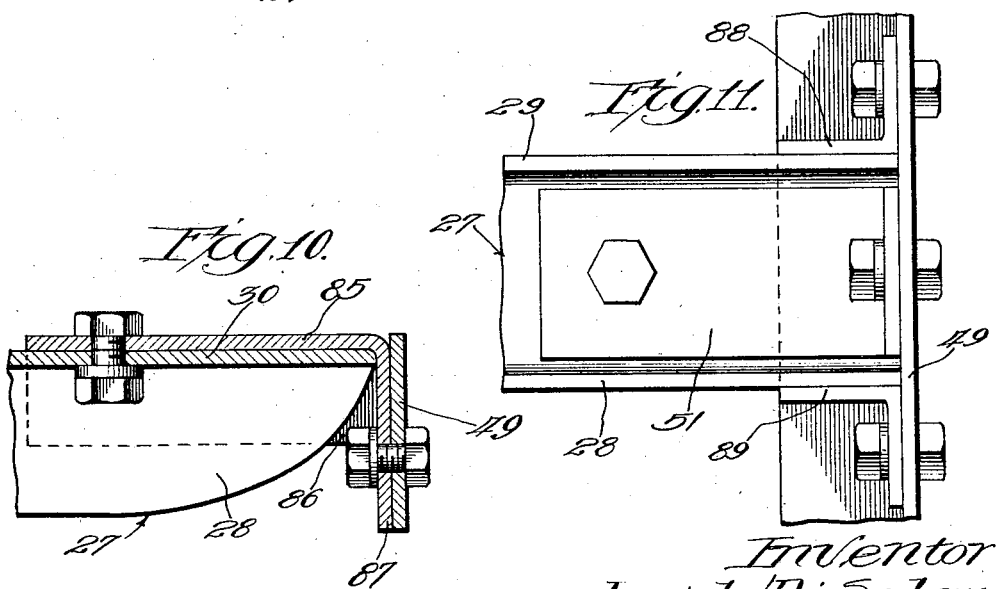

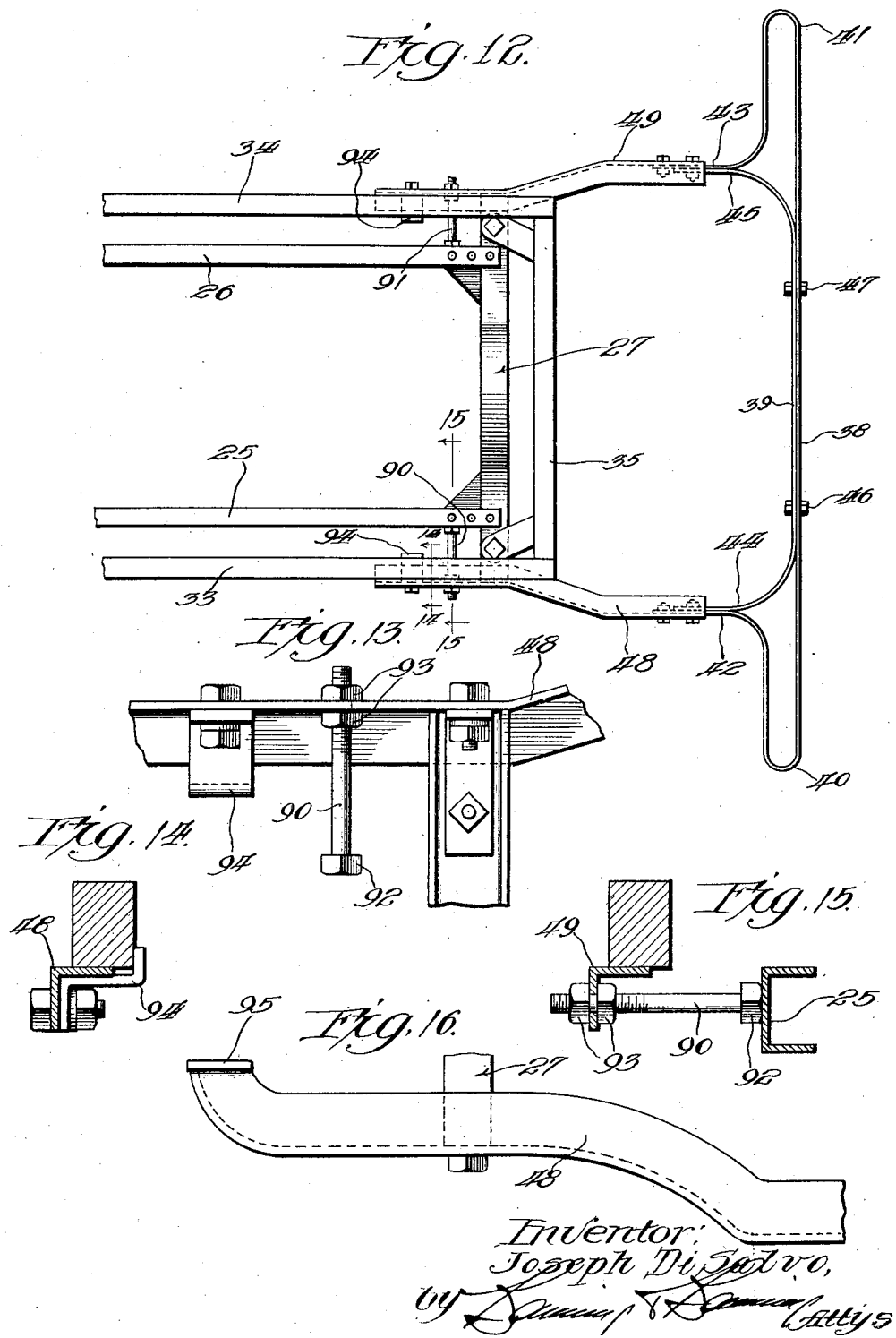

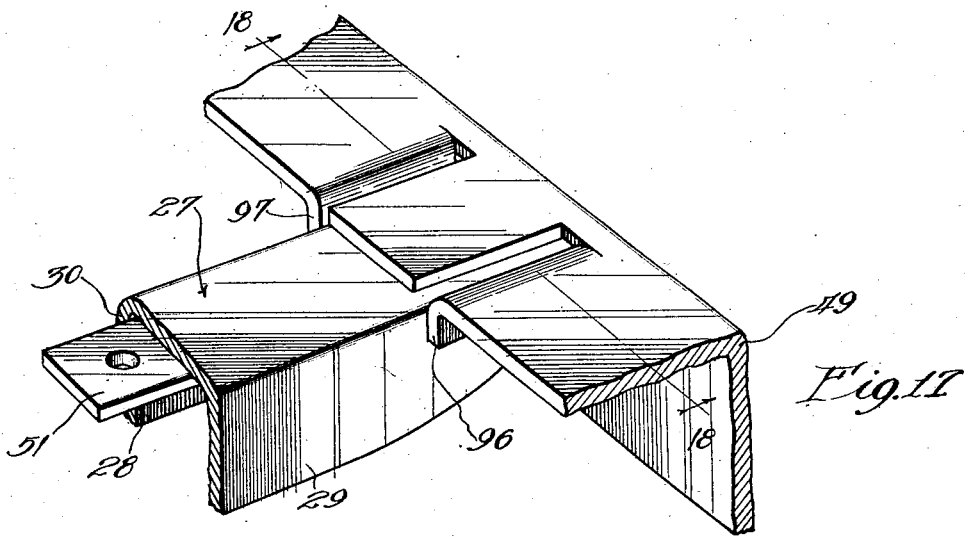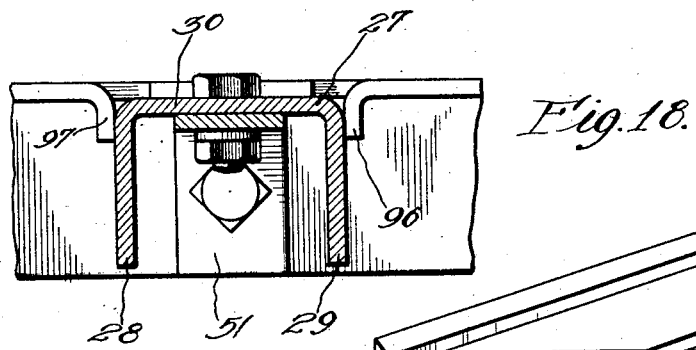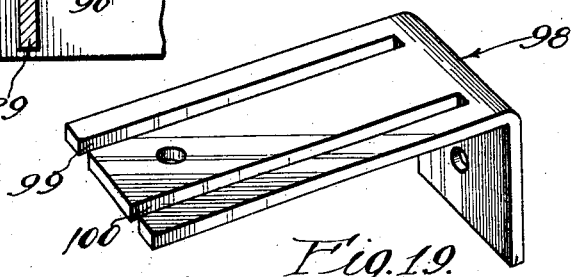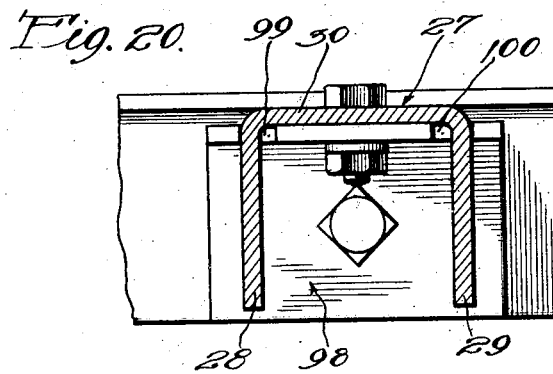

UNITED STATES PATENT OFFICE.

JOSEPH DI SALVO, OF CHICAGO, ILLINOIS.

BUMPER-BAR AND SUPPORT THEREFOR.

1,389,344.  Specification of Letters Patent.  Patented Aug. 30, 1921.

Application filed September 27, 1920. Serial No. 412,954.

*To all whom it may concern:*

Be it known that I, JOSEPH DI SALVO, a citizen of the United States, residing at Chicago, county of Cook, and State of Illinois, have invented certain new and useful Improvements in Bumper-Bars and Supports Therefor, of which the following is a specification.

This invention has to do with certain improvements in bumper bars for vehicles and the supporting device by which they are attached to such vehicles. The bumper bar and support herein disclosed are specially intended for use on the rear ends of automobiles, but it will presently appear that their usefulness is not limited to this particular application. Nevertheless, since the bumper bar and the support herein disclosed are peculiarly well adapted for this class of use, I will illustrate and describe such particular application in this present specification. In so doing, however, I do not intend to limit the scope of protection afforded my invention except as I may do so in the claims.

One of the features of the invention has to do with the supporting devices by means of which the bumper bar is attached to the automobile. The rear bumper bar has to be so supported that it will project far enough backward to protect the body of the automobile and any devices mounted thereon. Owing to the overhang of the body this ordinarily entails the use of supporting devices having a relatively large amount of rearward projection. One of the objects of the invention is to provide a support for the bumper bar which will give very substantial strength even with the relatively large amount of rearward projection thus made necessary.

Another feature of the invention has to do with the manner of attachment of the bumper bar support to the automobile or other vehicle itself. In order to secure the maximum strength, and to insure a direct transmission of forces to the frame of the vehicle, I have provided attaching devices of such form that the shock of a collision will be transmitted into the frame in a very direct manner, and into portions of the frame which are very well adapted to receive and resist such shock.

In this connection, another object of the invention is to provide a construction of bumper bar support which is peculiarly well adapted for use with Fords or similar cars, and which is so designed and shaped that it can be directly attached to the frames of the chassis of such cars.

Another feature of the invention has to do with the provision of a rear bumper bar support of such form that the tire carrier can be very readily attached thereto, the tire in such case being carried between the rear of the car and the bumper bar. In this connection, another object is to provide an arrangement which will present a neat and attractive appearance in addition to its utilitarian feature.

Other objects and uses of the invention will appear from a detailed description of the same which consists in the features of construction and combinations of parts hereinafter described and claimed.

Referring to the drawings:

Figure 1 is a plan view of the rear portion of an automobile frame having attached thereto a bumper bar and attaching device embodying the features of the present invention;

Fig. 2 is a side view corresponding to Fig. 1;

Fig. 3 is a perspective view of the bumper bar support showing the manner in which a tire carrier of simple design may be connected thereto;

Fig. 4 is a vertical section taken on the line 4—4 of Fig. 1 looking in the direction of the arrows;

Fig. 5 is a detail view of a simple form of attachment of the tire carrier to one side of the bumper bar support;

Fig. 6 is a fragmentary detail section through the bottom portion of the tire carrier being taken on the line 6—6 of Fig. 2 looking in the direction of the arrows, and on enlarged scale;

Fig. 7 is a fragmentary detail vertical section through the connection of one side of a modified bumper bar support to the chassis frame, being on enlarged scale as compared to the right hand portion of Fig 4;

Fig. 8 is a section taken on the line 8—8 of Fig. 7 looking in the direction of the arrows;

Fig. 9 is a detail view corresponding to Fig. 7 showing another modified form of bumper bar support;

Fig. 10 is a detail view corresponding to Figs. 7 and 9 but showing a third modified form of bumper bar support;

Fig. 11 shows a bottom view of the attachment of a fourth modified form of bumper bar support, to the chassis frame;

Fig. 12 shows a plan view of a bumper bar support similar to that of Figs. 1 to 4, and a modified form of its attachment to the frame of the vehicle, the modification consisting chiefly in the manner of attachment;

Fig. 13 shows on enlarged scale a bottom view of the attachment illustrated in Fig. 12;

Fig. 14 shows an enlarged detail section taken on the line 14—14 of Fig. 12 looking in the direction of the arrows;

Fig. 15 shows an enlarged detail section taken on the line 15—15 of Fig. 12 looking in the direction of the arrows;

Fig. 16 shows a fragmentary view of the end portion of a bumper bar support of another modified form;

Fig. 17 shows a fragmentary perspective view of another modified form of bumper bar support and the manner of its attachment to the chassis of the vehicle;

Fig. 18 is a detail transverse section taken on the line 18—18 of Fig. 17 looking in the direction of the arrows;

Fig. 19 is a detailed perspective view of a modified form of clip for use in connection with the type of construction shown in Figs. 17 and 18; and Fig. 20 is a detailed sectional view corresponding to Fig. 18 with the exception that the modified form of clip of Fig. 19 has been substituted.

Referring first to Figs. 1, 2, 3, 4, 5, and 6, the chassis frame illustrated includes the longitudinally extending side rails 25 and 26, to the rear end of which is attached a cross frame 27. This cross frame is shown as being of inverted channel shape cross section, having downwardly depending flanges 28 and 29, and a top web 30 as shown in Fig. 4. Furthermore, this cross frame 27 is bowed upwardly in its central portion as is clearly shown in Fig. 4. The end portions of this cross frame are so formed that the side rails 25 and 26 seat into depressed portions 31 and 32 as is clearly shown in Fig. 4.

The body which rests on the chassis frame is provided with side rails 33 and 34 which ordinarily rest on the projecting end portions of the frame member 27, and is also provided with a rear cross bar 35 as is clearly shown in Fig. 1. In the construction shown in said figure, the cross member 35 is secured to the frame member 27 by means of lugs 36 and 37, this being a simple mode of connection.

The bumper bar illustrated in Figs. 1 to 8 inclusive includes the plates 38 and 39, generally of spring steel. The plate 38 is bent around so as to provide the end portions 40 and 41 of the bumper bar, and the ends 42 and 43 of the plate 38 are folded back so that they extend directly forward. The plate 39 has its end portions curved around so that its ends 44 and 45 lie flat against the end portions 42 and 43 of the plate 38. A pair of clips or bolts 46 and 47 are passed through the plates 38 and 39 in the portion where they lie parallel to each other, and these fastenings are preferably of a more or less loose or movable nature so that when the bumper bar is deflected under pressure a certain amount of yielding action can take place.

The forwardly projecting portions of the bumper bar are connected to the rear portion of the vehicle frame by means of support arms 48 and 49 respectively. These arms are preferably of L-shape cross section, with the horizontal flanges at the top, and these flanges rest on the extreme end portions of the frame member 27 as clearly shown in several of the figures. The flanges extend forwardly immediately beneath the body stringers 33 and 34 as clearly shown in Fig. 1.

In order to secure the members 48 and 49 to the frame member 27 use may be had of the angle bars 50 and 51 as shown in Fig. 4. The horizontal arms of these angle bars are connected to the frame member 27 by the same bolts 52 and 53 which are used to attach the lugs 36 and 37 to the frame member; and the vertical arms of the angle bar are connected to the members 48 and 49 by the bolts 54 and 55.

If desired, the forward portion of the members 48 and 49 may be directly secured to the body stringers 33 and 34.

It will be observed that the members 48 and 49 are bent or otherwise so formed that their rear ends are farther apart than their forward ends. This makes it possible to secure the desired clearance between said rear ends, notwithstanding the fact that the frame member 27 is of limited length.

The members 48 and 49 constitute convenient supports for the tire carrier, which when provided may be located between the bumper bar proper and the rear end of the body. The tire carrier illustrated in the drawings is conveniently formed of stiff wire. Its construction will be readily understood from Fig. 3. Examination of this figure shows that the wire may be so bent as to provide a pair of semi-circular bottom supports 56 and 57, a pair of top cross supports 58 and 59 and a pair of central vertical supports 60 and 61, in conjunction with a central bottom cross bar 62 and side top cross bars 63 and 64 respectively.

All of these parts are formed from a single piece of wire or rod bent in the following manner: Commencing at the bottom at the point 65, upward in the side member 66, sidewise in the top member 67, circling around in the end member 68, curving downwardly and across and upwardly in the bottom member 69, circling around the end in the member 70, backward in the top member 71, downward in the side member 72, across in the bottom member 73, upward in the side member 74, sidewise in the top member 75, around the end in the end member 76, curving downwardly and then over and upwardly in the side member 77, circling across the end in the member 78, across in the top member 79, down in the side member 80, and back to the starting point. A nut 81 is provided for joining together the two ends of the wire or rod and for connecting the cross member 73 to them.

It will be observed that the two side members 63 and 64 are so formed as to provide hooks which may be engaged with the inwardly projecting lugs 82 and 83 which are mounted upon the members 48 and 49. These hooks may be secured to the members 82 and 83 in any suitable manner.

The angle bars 50 and 51 serve in conjunction with the supporting members 48 and 49 to clamp the end portions of the frame member 27 between them. Furthermore, these angle bars are of substantially the full width of the frame member 27 so as to seat securely between the flanges of said frame member and thus efficiently transmit the thrusts from the bumper bar to the frame.

In the modified construction shown in Figs. 7 and 8, the bumper bar supporting members 48 and 49 are formed of flat bars instead of channels. Use is also made of the angle members 50 and 51 for attaching the supporting members to the frame member 27. In order to provide members to cooperate with the angle bars for the purpose of clamping the web 30 of the frame member 27 between them, I have illustrated the short angle sections 84. The vertical legs of these sections lie between the angle members 50 and 51 and the supporting members 48 and 49, and the horizontal arms of the members 84 lie on top of the web 30 of the frame member 27.

The modified construction shown in Fig. 9 is similar to that of Figs. 7 and 8 with the exception that the supporting members 48 and 49 are of channel shape cross section with the flanges facing outwardly.

In the modified construction shown in Fig. 10 the supporting members 48 and 49 are of flat bars; but a modified means of attachment to the frame member 27 is illustracted. This modification consists in the use of a short section of channel bars 85 the flanges 86 of which embrace the end of the frame member 27 closely between them: and the web of this channel section 85 projects beyond its flanges and is bent down as at 87 to provide an element to which the corresponding supporting member may be connected.

In each of the constructions so far illustrated and described, the backward and forward thrust between the bumper bar and chassis frame is taken care of by having the attaching device itself closely embrace the flanges of the frame member 27. In the modified construction shown in Fig. 11, I have provided angle members 88 and 89 secured to the downwardly depending flange of the corresponding supporting member, which angle members closely engage the outside faces of the flanges of the frame member 27 for the purpose of transmitting thrust. When using this arrangement the angular connecting member 51 may closely embrace the inner faces of the flanges 28 and 29 of the frame member 27, or a clearance may be allowed as is particularly illustrated in Fig. 11.

In the construction shown in Figs. 12, 13, 14 and 15, I have provided means for preventing any lateral or swinging movement of the supporting members 48 and 49. This means take the form of a pair of lugs or the like 90 and 91 having their outer ends secured to the forward portions of the members 48 and 49 in advance of the point of connection of said members to the transverse frame member 27. The inner ends of these lugs 90 and 91 engage the chassis frame in such a manner as to prevent any rocking movement of the members 48 and 49.

As a convenient construction the lugs 90 and 91 comprise bolts whose heads 92 rest solidly against the chassis frame, said bolts passing through the forward portion of the supporting members 48 and 49 and being rigidly clamped thereto by means of nuts 93. These nuts may be set back and forth after the supporting members 48 and 49 are in position on the frame member 27 so as to adjust the parts into a very rigid position.

As a further insurance against any swinging of the supporting members 48 and 49 clips 94 may be secured to their inner ends, said clips embracing the body frame members 33 and 34 respectively. A still further modification shown in Fig. 16 consists in the provision of a hook member 95 on the inner end of each of the frame members 48 and 49, said hook members taking the place of the clips just explained.

In the modified construction in Figs. 17 and 18, the thrusts between the supporting members and the frame member 27 are transmitted by ears 96 and 97 which are stamped out of the metal of the supporting members themselves in such positions as to closely embrace the frame between them.

In the modified construction shown in Figs. 19 and 20, a specially formed clip 98 is used. This clip has a pair of longitudinally extending slots 99 and 100 in its horizontal arm which slots receive the flanges 28 and 29 of the frame member 27; and the vertical arm of the member 98 is secured to the supporting member 48 or 49 as the case may be.

While I have herein shown and described only certain embodiments of the features of my invention still I do not limit myself to said embodiments except as I may do so in the claims.

I claim:

1. The combination with the side rails and the back cross end channel member of a chassis frame and the side stringers of a body frame located above the end portions of said cross end member, of a pair of rearwardly extending supporting arms adjacent to the ends of said cross channel member and the rear portion of the body stringers, a bumper bar in conjunction with the rear end of said supporting arms, and means for securing said supporting arms rigid with respect to the cross end member, said means including angle bars having their horizontal arms located between the flanges of the end channel member and having their vertical arms against the aforesaid supporting arms and secured thereto, whereby said supporting arms are secured against movement with respect to the cross end member by the engagement of the angle bars with the channel flanges, substantially as described.

2. The combination with the side rails and the back cross end channel member of a chassis frame, of a pair of rearwardly extending supporting arms adjacent to the ends of said cross channel member, a bumper bar in conjunction with the rear ends of said supporting arms, and means for securing said supporting arms rigid with respect to the cross end member, said means including angle bars having their horizontal arms located between the flanges of the end channel member and having their vertical arms against the aforesaid supporting arms and secured thereto, whereby said supporting arms are secured against movement with respect to the cross end member by the engagement of the angle bars with the channel flanges, substantially as described.

3. The combination with the side rails and the back cross end channel member of a chassis frame, of a pair of rearwardly extending supporting arms adjacent to the ends of said cross channel member, a bumper bar in conjunction with the rear ends of said supporting arms, and means for securing said supporting arms rigid with respect to the cross end member, said means including angle bars having their horizontal arms in engagement with the flanges of the cross end member, and having their vertical arms against the aforesaid supporting arms and secured thereto, whereby said supporting arms are secured against movement with respect to the cross end member by the engagement of the angle bars with the channel flanges, substantially as described.

4. The combination with the side rails and the back cross end channel member of a chassis frame, of a pair of rearwardly extending supporting arms adjacent to the ends of said cross channel member, a bumper bar in conjunction with the rear ends of said supporting arms, and means for securing said supporting arms rigid with respect to the cross end member, said means including angle bars each having one arm in engagement with a flange of the cross end member and having another arm in engagement with and secured to the aforesaid supporting arms, whereby said supporting arms are secured against movement with respect to the cross end member by the engagement of the angle bars with the channel flanges, substantially as described.

5. The combination with the side rails and the back cross end channel member of a chassis frame, of a pair of rearwardly extending supporting arms adjacent to the ends of said cross channel member, a bumper bar in conjunction with the rear ends of said supporting arms, and means for securing said supporting arms rigid with respect to the cross end member, and including angle members rigid with respect to the supporting arms and engaging the cross end member flanges, whereby said supporting arms are secured against movement with respect to the cross end member by the engagement of the angle bars with the channel flanges, substantially as described.

6. The combination with the side rails and the back cross end channel member of a chassis frame, and the side stringers of a body frame located above the end portions of said cross member, of a pair of rearwardly extending supporting arms adjacent to the ends of said cross channel member and the rear portion of the body stringers, a bumper bar in conjunction with the rear ends of said supporting arms, and means for securing said supporting arms rigid with respect to the cross end member, each supporting arm comprising an angle bar having its horizontal arm extending inwardly and lying between the end portion of the cross end channel member and the body stringer above said end, substantially as described.

7. A bumper bar comprising two lengths of bar metal, one having a relatively long straight front face portion and two reentrant end portions extending inwardly parallel to the front face portion, and then curving rearwardly to a position at right angles to the front face portion, and the other strip having a relatively long straight front portion parallel to the central portion of the first strip and having its ends curved rearwardly to a position at right angles to the front face portion and into engagement with the rearwardly extending end portions of the first mentioned strip, substantially as described.

JOSEPH DI SALVO.